United States Patent
Abbiati (10) Patent No.: US 10,054,752 B2
(45) Date of Patent: Aug. 21, 2018

(54) ASSEMBLY FOR RETAINING AND SECURING AN OPTICAL CABLE

(71) Applicant: Prysmian S.p.A., Milan (IT)

(72) Inventor: Fabio Abbiati, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 15/528,203

(22) PCT Filed: Nov. 20, 2014

(86) PCT No.: PCT/EP2014/075207
§ 371 (c)(1),
(2) Date: May 19, 2017

(87) PCT Pub. No.: WO2016/078725
PCT Pub. Date: May 26, 2016

(65) Prior Publication Data
US 2017/0322387 A1 Nov. 9, 2017

(51) Int. Cl.
*G02B 6/44* (2006.01)
*G02B 6/36* (2006.01)

(52) U.S. Cl.
CPC ......... *G02B 6/4471* (2013.01); *G02B 6/3616* (2013.01); *G02B 6/3628* (2013.01); *G02B 6/4441* (2013.01); *G02B 6/4469* (2013.01)

(58) Field of Classification Search
CPC .. G02B 6/4441; G02B 6/4469; G02B 6/4471; G02B 6/4472; G02B 6/3616; G02B 6/3628; G02B 6/3632; G02B 6/3636; G02B 6/444

USPC .......... 385/100, 102, 109, 134–139
See application file for complete search history.

(56) References Cited

U.S. PATENT DOCUMENTS

| 6,687,450 B1 * | 2/2004 | Kempeneers ........ G02B 6/4472 385/135 |
| 7,418,186 B1 | 8/2008 | Grubish et al. |
| 2010/0290754 A1 | 11/2010 | Yamauchi |

FOREIGN PATENT DOCUMENTS

| EP | 1 389 736 A1 | 2/2004 |
| JP | 5-60945 A | 3/1993 |
| JP | 2003-344700 A | 12/2003 |
| JP | 2005-265975 A | 9/2005 |
| JP | 2007-232947 A | 9/2007 |
| JP | 2008-241729 A | 10/2008 |

OTHER PUBLICATIONS

International Search Report and Written Opinion dated Aug. 3, 2015 in PCT/EP2014/075207 filed Nov. 20, 2014.

* cited by examiner

*Primary Examiner* — Jerry Rahill
*Assistant Examiner* — Michael Mooney
(74) *Attorney, Agent, or Firm* — Oblon, McClelland, Maier & Neustadt, L.L.P.

(57) ABSTRACT

An assembly for retaining and securing an optical cable includes a retaining element and a housing with an insertion seat. The retaining element has a first retaining wall, a second retaining wall and a connection part connecting the first and second retaining walls. The connection part is configured to resiliently deform upon insertion of the retaining element in the insertion seat to allow mutual approach of said first and second retaining walls.

15 Claims, 6 Drawing Sheets

ASSEMBLY FOR RETAINING AND SECURING AN OPTICAL CABLE

FIELD OF THE INVENTION

The present invention relates to the field of equipment and components for the installation of optical cables in optical (access) networks. In particular, the present invention relates to an assembly for retaining and securing an optical cable.

BACKGROUND OF THE INVENTION

A FTTH ("Fiber To The Home") network is an optical access network providing a number of end customers with broadband communication services from operators, i.e. with services requiring data transmission at a rate of some hundreds of Mbit/s or more.

Within the framework of the present description and in the following claims, the term "optical access network" is used to indicate optical cables and devices forming the connecting structure which is designed on the basis of the architecture of the customers' residences, which can either comprises single dwelling units (houses) or multi dwelling units (apartment blocks).

Typically, a FTTH network comprises a central unit which is connected with one (or more) distribution box which is typically located in the basement of the building where the end customers reside.

From the distribution box, the final customer can be directly reached by an optical cable, hereinafter referred to as "drop cable".

Alternatively, when the distribution box is located in a building having multi dwelling units, for example arranged in a plurality of floors, intermediate optical modules are installed at each floor for receiving an optical cable, hereinafter referred to as "riser cable", which exits the distribution cabinet and runs vertically through the building from the basement up to all the building floors. Typically, riser cables may contain up to 96 optical fibers. The connection between the intermediate optical modules and the customer's residence is then performed with drop cables connected to the relevant fibers of the riser cable, typically at the customer's floor.

Distribution boxes, as well as optical modules or the like, comprise an opening suitable for housing the end of the optical cables and also components for retaining and securing said optical cables.

PCT/EP2013/073343, filed by the Applicant, discloses an optical termination box with an assembly for retaining and securing an optical cable. The assembly comprises a retaining element with an insertion port configured to allow side insertion of an optical cable in a seat and elastic arms configured to act on the optical cable for retaining the optical cable. The insertion port is closed by a mounting surface of the optical termination box when the retaining element is attached to the mounting surface for securing the optical cable to the optical termination box. The elastic arms elastically deform upon insertion of an optical cable in the seat and generate an elastic load along a transversal direction and directed towards the optical cable.

SUMMARY OF THE INVENTION

The Applicant has perceived that, with the solution proposed in PCT/EP2013/073343, the optical cable has to be pushed hardly by a customer for deforming the elastic arms in order to put the optical cable into the retaining element before the latter is inserted in the seat.

In view of the above, the Applicant has tackled the problem of providing an assembly for retaining and securing optical cables allowing installation of optical cables simplifying installation and saving moulding costs.

The Applicant has found that it is convenient to have an assembly for retaining and securing an optical cable in which a retaining element has opposite retaining walls and a connection part connecting them which resiliently deforms upon insertion of the retaining element in the insertion seat of a housing to allow mutual approach of at least a portion of the opposite retaining walls in order to prevent the optical cable to slip off from the retaining element.

Therefore, the present invention relates to an assembly for retaining and securing an optical cable comprising: a retaining element comprising a first retaining wall, a second retaining wall and a connection part connecting said first retaining wall to said second retaining wall, wherein said connection part, said first retaining wall and said second retaining wall define a retaining seat for receiving an optical cable, a housing comprising an insertion seat configured to receive said retaining element, wherein said connection part is configured to resiliently deform upon insertion of said retaining element in the insertion seat to allow mutual approach of at least a portion of said first and second retaining walls.

Preferably, said connection part extends between said first and second retaining walls along a retaining direction transverse to the cable longitudinal direction and is configured to deform along said retaining direction to allow mutual approach of said at least a portion of said first and second retaining walls along said retaining direction.

Preferably, said first and second retaining walls have sloped outer surfaces diverging from the connection part.

Preferably, the slope angle of outer surfaces of said first and second retaining walls is comprised between 5 and 15° with respect to the perpendicular direction to the connection part.

Preferably, said housing comprises an insertion structure defining said insertion seat and said insertion structure comprises first and second insertion walls facing one another and configured to act respectively on said first and second retaining walls of the retaining element to allow mutual approach of said at least a portion of said first and second retaining walls upon insertion of said retaining element between said first and second insertion walls.

Preferably, said outer surfaces of the first and second retaining walls are sloped at a first angle, said first and second insertion walls are sloped at a second angle, the second angle is smaller than or equal to the first angle so as to allow said at least a portion of the first and second retaining walls to mutually approach upon insertion of said retaining element into said insertion seat.

Preferably, said first and second insertion walls have inner surfaces facing one another and configured to act respectively on the outer surfaces of the first and second retaining walls of the retaining element.

Preferably, the inner surfaces of first and second insertion walls are sloped at the second angle.

Preferably, said insertion structure is configured to removably attach said retaining element to said housing.

Preferably, said insertion structure comprises a housing attachment member, said retaining element comprises a retaining attachment member configured to engage said housing attachment member to removably attach said retaining element to said housing.

Preferably, said housing attachment member comprises an attachment wall extending along a direction transverse to said longitudinal direction, said retaining attachment member comprises a protrusion removably engaging an edge of said attachment wall.

Preferably, said retaining element has an insertion opening for insertion of the optical cable in the retaining seat along an insertion direction and two passage openings for passage of the optical cable received in the retaining seat, said insertion opening extends along said longitudinal direction between said two passage openings such that the optical cable received in the retaining seat comes out from the retaining element at opposite sides through the two passage openings and is surrounded by said connection part and said first and second retaining walls.

Preferably, said insertion opening is arranged opposite to said connection part with respect to said retaining seat.

Preferably, said retaining element comprises retaining clips formed on facing inner surfaces of said first and second retaining walls, said retaining clips are configured to prevent the optical cable to slip off the retaining seat in a direction transverse to said longitudinal direction.

Preferably, said retaining element comprises retaining teeth formed on facing inner surfaces of said first and second retaining walls, said retaining teeth are configured to prevent the optical cable to slide relative to said retaining element along said longitudinal direction.

Preferably, said connection part comprises a plurality of connection members arranged in succession along said longitudinal direction for connecting a portion of said first retaining wall with a respective portion of said second retaining wall, each connection member is configured to resiliently deform upon insertion of said retaining element in said insertion seat to allow mutual approach of said at least a portion of said first and second retaining walls.

BRIEF DESCRIPTION OF THE DRAWINGS

The present invention will now be described in more detail hereinafter with reference to the accompanying drawings, in which some embodiments of the invention are shown. Drawings illustrating the embodiments are not-to-scale schematic representations.

DETAILED DESCRIPTION

For the purposes of the present description and claims an optical cable is deemed to be an optical cable comprising one or more optical fibers, possibly arranged inside one or more buffer tubes, an outer sheath and, optionally, one or more strength members.

An optical fiber typically comprises an optical waveguide, constituted by an optically transmissive core, surrounded by a cladding. The optical waveguide is preferably covered by at least one protective coating layer ("coating"). Typically two protective coating layers are present: the first coating layer ("primary coating") is in direct contact with the optical waveguide, while the second coating layer ("secondary coating") covers the primary coating. In addition, a buffer layer may cover each optical fiber, the buffer layer may be substantially in contact with the secondary coating ("tight buffer") or it may consist of a small tube of inner diameter somehow larger than the outer diameter of the secondary coating ("loose buffer").

Figure 4:
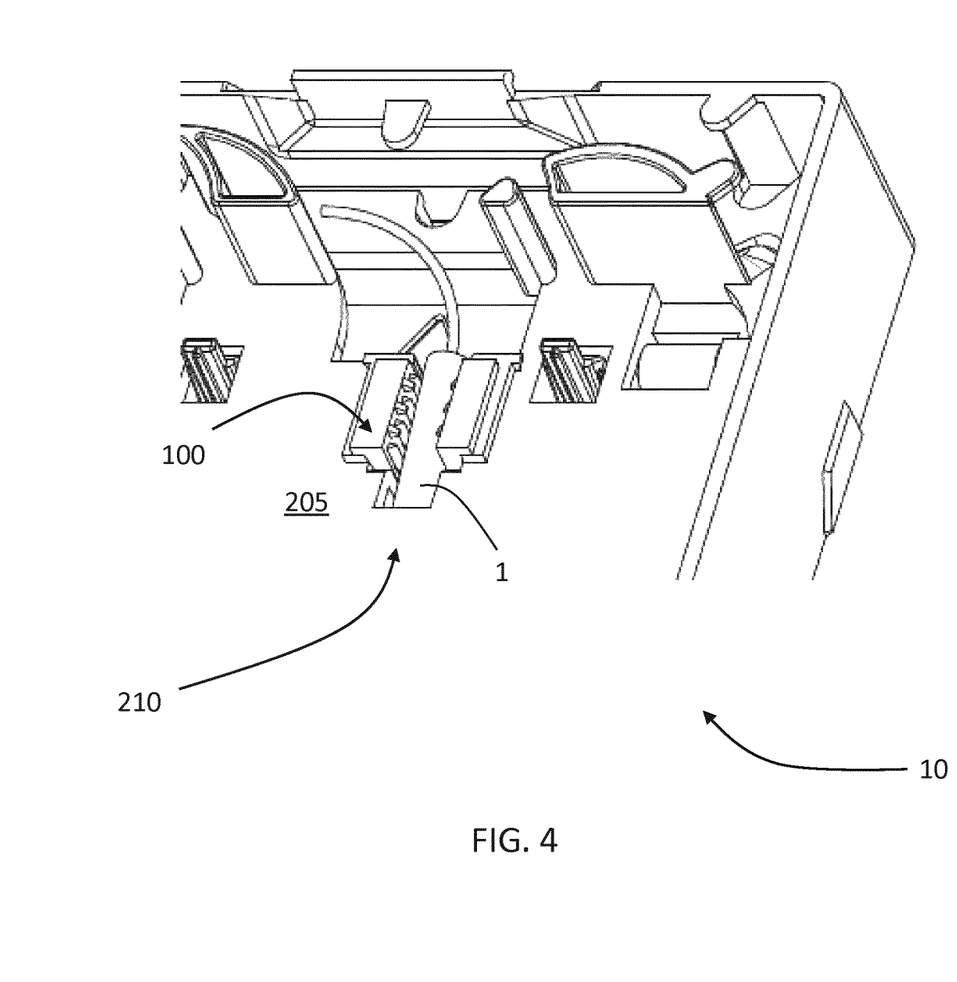
FIG. 4 is a schematic representation of an assembly of the retaining element of FIG. 2 retaining an optical cable and received in the housing of FIG. 3, FIGS. 5 and 6 are plan views of the retaining element of FIG. 1 retaining an optical cable and attached to a housing.
Figure 5:
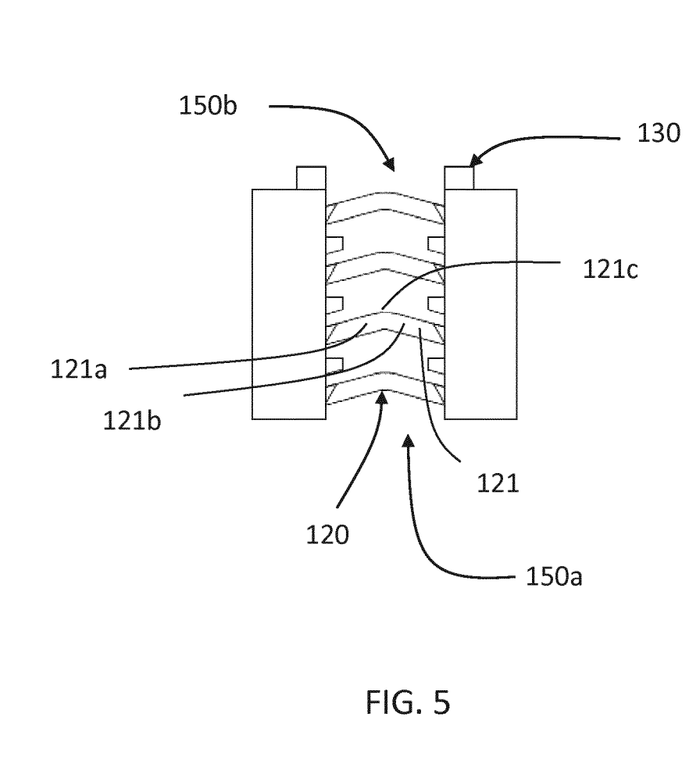
Figure 6:
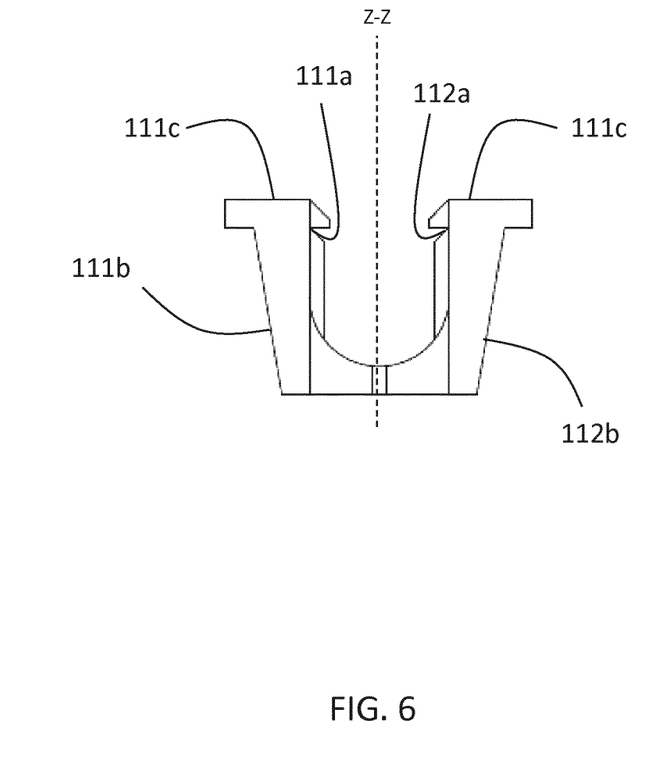

FIG. 4 shows a diagrammatic view of an assembly 10 for retaining and securing an optical cable 1.

The assembly 10 comprises a retaining element 100 and a housing 200 having an insertion seat 205 configured to receive the retaining element 100.

In this embodiment, the housing 200 is part of an optical equipment, for example an optical distribution box or an optical module. The housing 200 has a base surface 201 provided with the insertion seat 205.

Figures 1, 2:
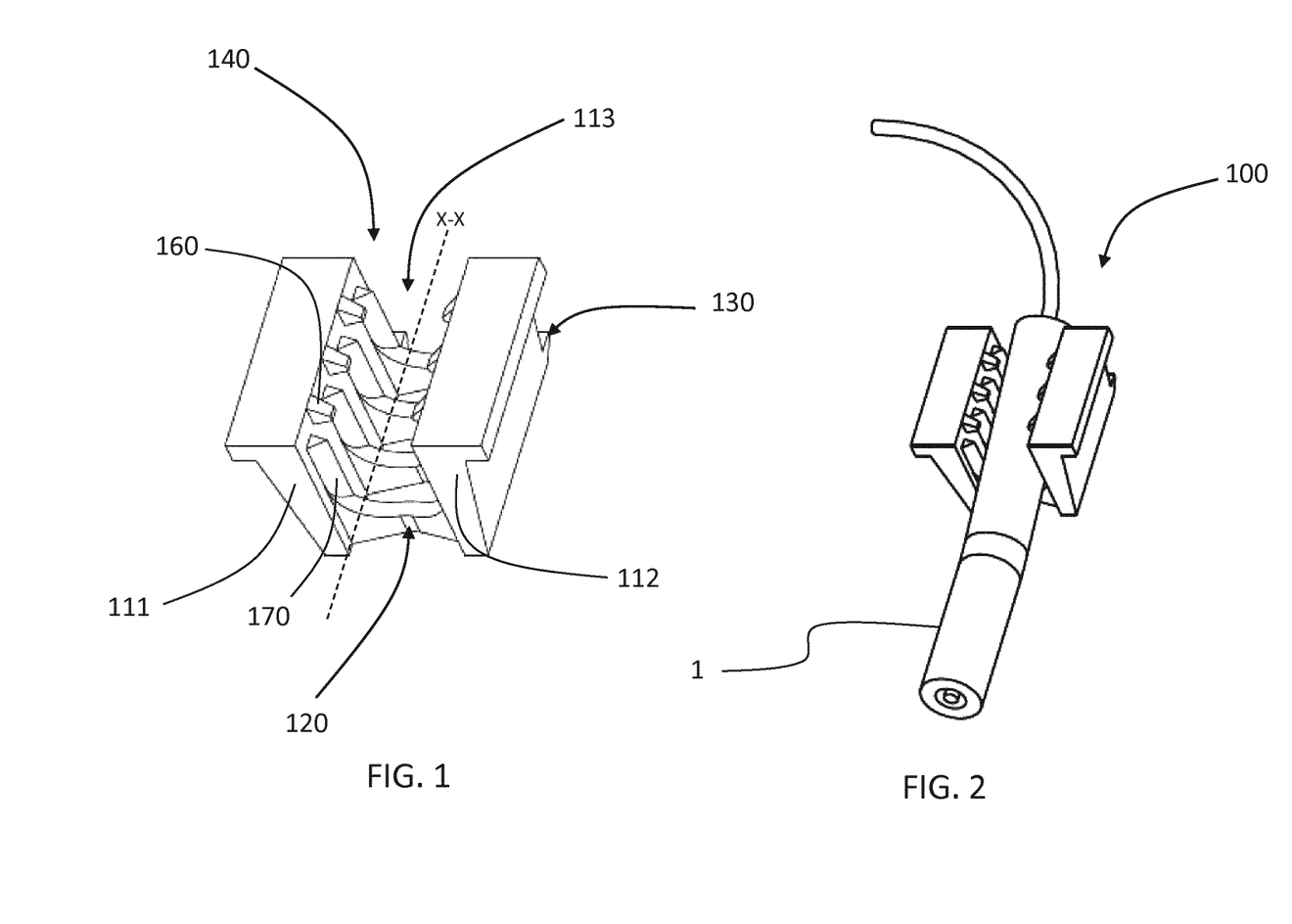
FIG. 1 is a schematic representation of a retaining element of an assembly to an embodiment of the present invention.
FIG. 2 is a schematic representation of the retaining element of FIG. 1 retaining an optical cable.

With reference to the example shown in FIG. 1, the retaining element 100 comprises a first retaining wall 111, a second retaining wall 112 and a connection part 120 connecting the first retaining wall 111 with the second retaining wall 112.

The connection part 120, the first and the second retaining walls 111,112 define a retaining seat 113 for receiving the optical cable 1 along a longitudinal direction X-X.

According to one embodiment, the retaining element 100 has an insertion opening 140 for insertion of the optical cable 1 in the retaining seat 113 and two passage openings 150a,150b for passage of the optical cable 1 received in the retaining seat 113. The insertion opening 140 extends along the longitudinal direction X-X between the two passage openings 150a,150b such that the optical cable 1 received in the retaining seat 113 comes out from the retaining element 100 at opposite sides through the two passage openings 150a,150b and is surrounded by the connection part 120 and the first and second retaining walls 111,112.

In particular, the optical cable 1 is inserted in the retaining seat 113 along an insertion direction Z-Z transverse to the longitudinal direction X-X.

Preferably, the insertion opening 140 is arranged opposite to the connection part 120 with respect to the retaining seat 113.

The connection part 120 is configured to resiliently deform upon insertion of the retaining element 100 in the retaining seat 113 to allow mutual approach of at least a portion of the first and second retaining walls 111,112. This allows the optical cable 1 to be compressed by the first and second retaining walls 111,112 thereby increasing the retaining action of the retaining element 100 on the optical cable 1 during insertion of the retaining element 100 in the insertion seat 205, when the optical cable 1 is seated in the retaining seat 113.

To effectively act on the optical cable 1, the first and second retaining walls 111,112 are preferably made of a rigid and practically undeformable material.

Preferably, the connection part 120 extends between the first retaining wall 111 and the second retaining wall 112 along a retaining direction Y-Y transverse to the longitudinal direction X-X and is configured to deform along this retaining direction Y-Y to allow mutual approach of the first and second retaining walls along this retaining direction Y-Y.

In particular, the first and second retaining walls 111,112 face one another along the longitudinal direction X-X.

In particular, the first and second retaining walls 111,112 have respective inner surfaces 111a,112a and outer surfaces 111b,112b. The inner surfaces 111a,112a face one another and, preferably, lay on parallel planes. More preferably, the parallel planes are perpendicular to the base surface 201 of the housing 200. With this arrangement, upon insertion of the retaining element 100 in the retaining seat 113, the first and second retaining walls 111,112 mutually approach such that the inner surfaces 111a,112a are maintained parallel one another.

With reference to the insertion direction Z-Z of the optical cable 1 in the retaining seat 113, this insertion direction Z-Z is transverse to the longitudinal direction X-X and to the retaining direction Y-Y and is parallel to the planes of the inner surfaces 111a,112a.

The inner surfaces 111a,112a define the surfaces of the retaining element 100 configured to act on the optical cable 1 when the optical cable 2 is seated in the retaining seat 113.

Preferably, the outer surfaces 111b,112b are sloped. In particular, the outer surfaces 111b,112b are sloped relative to the inner surfaces 111a,112a.

More preferably, the outer surfaces 111b,112b are sloped towards the connection part 120. In particular, the sloped outer surfaces 111b,112b define tapered surfaces of the retaining element 100 configured to cooperate with the insertion seat 205 of the housing 200 during insertion of the retaining element 100 in the insertion seat 205 to make it easier this insertion.

Figure 3:
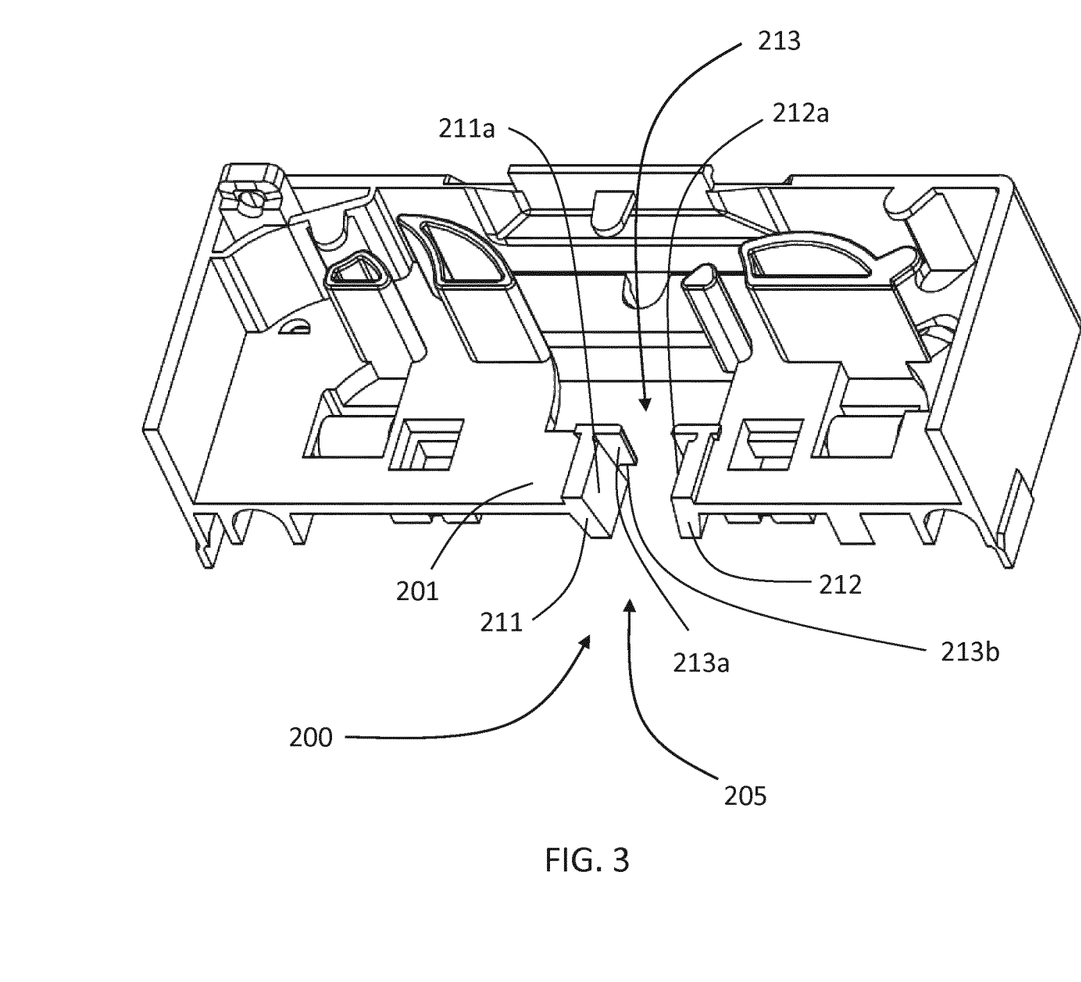
FIG. 3 is a schematic representation of a housing configured for receiving the retaining element of FIG. 1.

According to one embodiment, the housing 200 comprises an insertion structure 210 defining the insertion seat 205. The insertion structure 210 comprises first and second insertion walls 211,212 facing one another and configured to act respectively on the first and second retaining walls 111,112 of the retaining element 100 to allow mutual approach of the first and second retaining walls 111,112 upon insertion of the retaining element 100 in the insertion seat 205 between these first and second insertion walls 211,212.

According to one embodiment, the retaining element 100 comprises retaining teeth 170 formed on facing inner surfaces 111a,112 of the first and second retaining walls 111, 112. The retaining teeth 170 are configured to prevent the optical cable 1 to slide relative to the retaining element 100 along the longitudinal direction X-X.

In particular, the first and second insertion walls 211,212 have inner surfaces 211a,212a facing one another and configured to act respectively on the outer surfaces 111b,112b of the first and second retaining walls 111,112 of the retaining element 100.

Figure 7:
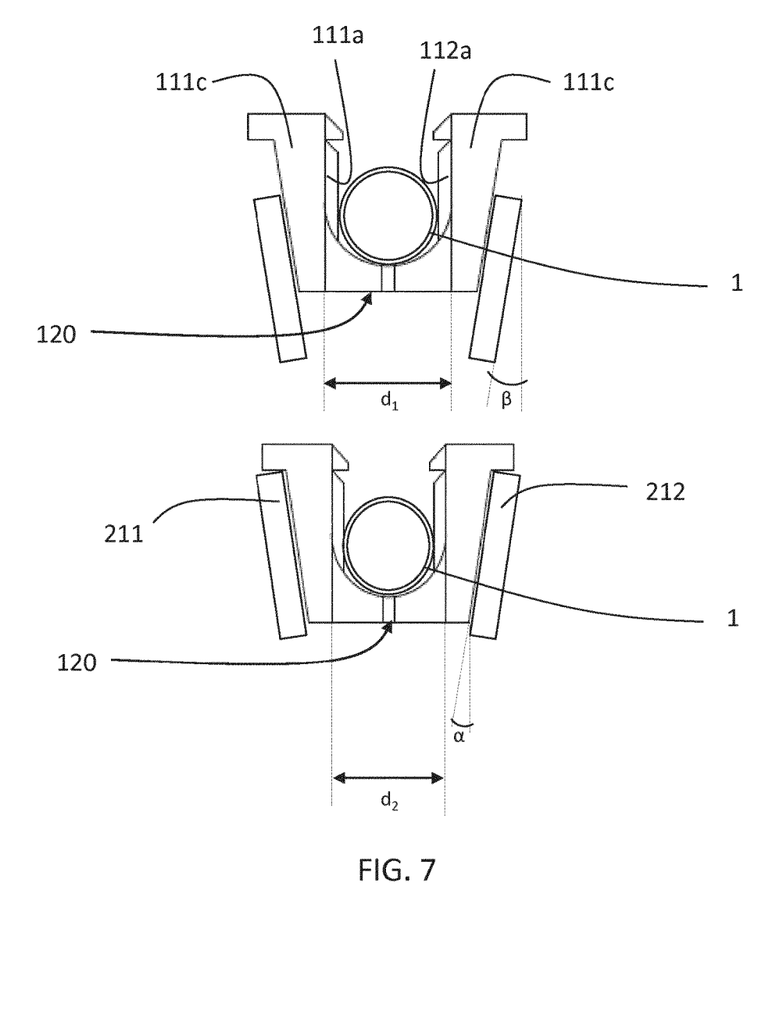
FIGS. 7 and 8 are plan views of the retaining element of FIG. 6 during insertion in a seat.

With reference to the example shown in FIG. 7, the outer surfaces 111b,112b are sloped at a first angle α and the first and second insertion walls 211,212 are sloped at a second angle β that is equal to the first angle α so as to allow the first and second retaining walls 111,112 to remain in contact with the respective first and second insertion walls 211,212 while they mutually approach upon insertion of the retaining element 100 into the insertion seat 205. Indeed, upon insertion of the retaining element 100 in the insertion seat 205, the connection part 120 is configured to resiliently deform to allow mutual approach of the first and second retaining walls 111,112.

As shown in the example FIG. 7, before the insertion the distance $d_1$ between the first and the second retaining walls 111,112 is higher than the distance $d_2$ between the first and the second retaining walls 111,112 after the insertion.

The first angle α and the second angle β are preferably comprised between 5° and 15°, preferably about 10°.

Figure 8:
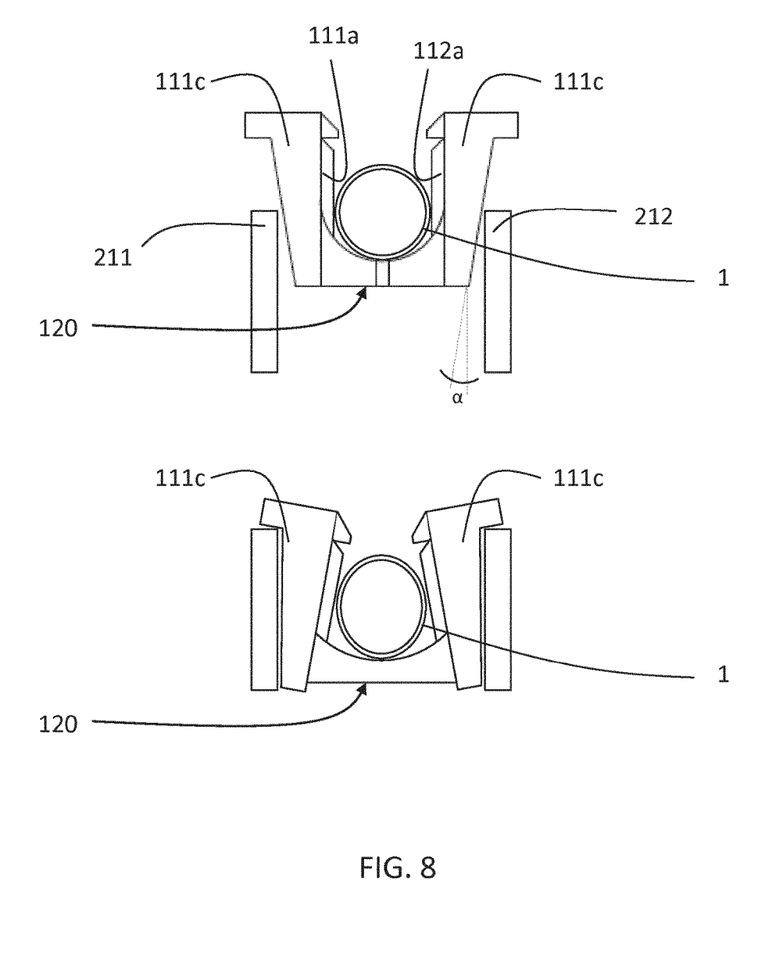

According to one embodiment shown in the example of FIG. 8, when the first and second insertion walls 211,212 are arranged at a right angle with respect to the base surface 201 of the housing 200, the first and the second retaining walls 111,112 lightly rotate upon insertion of the retaining element 100 into the insertion seat 205 so that the first angle α changes from e.g. 10° to 0°. With this embodiment, upon insertion of the retaining element 100 into the insertion seat 205, the upper portions of the first and second retaining walls 111,112 mutually approach while the lower portions of the first and second retaining walls 111,112 move away one another.

In both the embodiments of FIGS. 7 and 8, upon the insertion of the retaining element 100 into the insertion seat 205, the cable 1 is lightly pressed between the retaining walls 111,112 for retaining and securing the cable 1 into the retaining element 100. Preferably, the retaining teeth 170 are configured to indent the outer sheath of the optical cable 1 to prevent the optical cable 1 to slide relative to the retaining element 100 along the longitudinal direction X-X According to one embodiment, the insertion structure 210 is configured to removably attach the retaining element 100 to the housing 200. To this purpose, the insertion structure 210 comprises a housing attachment member 213 and the retaining element 100 comprises a retaining attachment member 130 configured to engage the housing attachment member 213 to removably attach the retaining element 100 to the housing 200.

Preferably, the housing attachment member 213 comprises an attachment wall 213a extending along the retaining direction Y-Y and the retaining attachment member 130 comprises a protrusion removably engaging an edge 213b of the attachment wall 213a.

According to one embodiment, the retaining element 100 comprises retaining clips 160 formed on the facing inner surfaces 111a,112a of the first and second retaining walls 111,112. These retaining clips 160 are configured to prevent the optical cable 1 to slip off the retaining seat 113 along the insertion direction Z-Z.

Preferably, the retaining clips 160 are arranged at end portions 111c,112c of the first and second retaining walls 111,112 opposite to the connection part 120 with respect to the retaining seat 113 and protrude one another from the inner surfaces 111a,112a of the first and second retaining walls 111,112.

Preferably, the retaining teeth 170 are arranged in succession along the longitudinal direction X-X, and are spaced apart along this longitudinal direction X-X, on each of the first and second retaining walls 111,112. In particular, the retaining teeth 170 extend along the insertion direction Z-Z.

According to one embodiment, the connection part 120 comprises a plurality of connection members 121 arranged in succession along the longitudinal direction X-X for connecting a portion of the first retaining wall 111 with a respective portion of the second retaining wall 112. Each connection member 121 is configured to resiliently deform upon insertion of the retaining element 100 in the insertion seat 205 to allow mutual approach of the first and second retaining walls 111,112.

Preferably, each connection member 121 has two sloping legs 121a,121b and a ridge 121c arranged between the two sloping legs 121a,121b. The two sloping legs 121a,121b lay in a plane parallel to the longitudinal direction X-X, in particular parallel to the plane of the base surface 201 of the housing 200.

The invention claimed is:

1. An assembly for retaining and securing an optical cable, said assembly comprising:
 a retaining element comprising:
  a first retaining wall and a second retaining wall, and
  a connection part connecting said first retaining wall to said second retaining wall, wherein said connection part and said first and second retaining walls define a retaining seat configured to receive an optical cable along a longitudinal direction; and
 a housing comprising an insertion seat configured to receive said retaining element,
 wherein:
 said connection part is configured to resiliently deform upon insertion of said retaining element in the insertion seat to allow mutual approach of at least a portion of said first and second retaining walls,
 said connection part comprises a plurality of connection members arranged in succession along the longitudinal direction to connect a portion of the first retaining wall with a respective portion of the second retaining wall, and
 each connection member is configured to resiliently deform upon insertion of the retaining element in the insertion seat to allow mutual approach of said at least a portion of the first and second retaining walls.

2. The assembly according to claim 1, wherein:
 said connection part extends between said first and second retaining walls along a retaining direction transverse to said longitudinal direction, and is configured to deform along said retaining direction to allow mutual approach of said at least a portion of said first and second retaining walls along said retaining direction.

3. The assembly according to claim 1, wherein:
 said first and second retaining walls have respective inner surfaces facing one another and outer surfaces, and
 said outer surfaces are sloped.

4. The assembly according to claim 3, wherein:
 said outer surfaces are sloped diverging from the connection part.

5. The assembly according to claim 1, wherein:
 said housing comprises an insertion structure defining said insertion seat, and
 said insertion structure comprises first and second insertion walls facing one another and configured to act respectively on said first and second retaining walls of the retaining element to allow mutual approach of said first and second retaining walls upon insertion of said retaining element in said insertion seat between said first and second insertion walls.

6. The assembly according to claim 5, wherein:
 outer surfaces of said first and second retaining walls are sloped at a first angle,
 said first and second insertion walls are sloped at a second angle, and
 the second angle is equal to or smaller than the first angle so as to allow said at least a portion of the first and second retaining walls to mutually approach upon insertion of said retaining element into said insertion seat.

7. The assembly according to claim 5, wherein:
 said first and second insertion walls have inner surfaces facing one another and configured to act respectively on outer surfaces of the first and second retaining walls of the retaining element.

8. The assembly according to claim 7, wherein:
 said inner surfaces of said first and second insertion walls are sloped at said second angle.

9. The assembly according to claim 5, wherein:
 said insertion structure is configured to removably attach said retaining element to said housing.

10. The assembly according to claim 9, wherein:
 said insertion structure comprises a housing attachment member, and
 said retaining element comprises a retaining attachment member configured to engage said housing attachment member to removably attach said retaining element to said housing.

11. The assembly according to claim 10, wherein:
 said housing attachment member comprises an attachment wall extending along a direction transverse to said longitudinal direction, and
 said retaining attachment member comprises a protrusion removably engaging an edge of said attachment wall.

12. The assembly according to claim 1, wherein:
 said retaining element has an insertion opening for insertion of the optical cable in the retaining seat along an insertion direction transverse to the longitudinal direction and two passage openings for passage of the optical cable received in the retaining seat, and
 said insertion opening extends along the longitudinal direction between the two passage openings such that the optical cable received in the retaining seat comes out from the retaining element at opposite sides through the two passage openings and is surrounded by the connection part and the first and second retaining walls.

13. The assembly according to claim 12, wherein:
 said insertion opening is arranged opposite to the connection part with respect to the retaining seat.

14. The assembly according to claim 1, wherein:
 said retaining element comprises retaining clips formed on the facing inner surfaces of the first and second retaining walls, and
 said retaining clips are configured to prevent the optical cable to slip off the retaining seat along a direction transverse to the longitudinal direction.

15. The assembly according to claim 1, wherein:
 said retaining element comprises retaining teeth formed on facing inner surfaces of the first and second retaining walls, and
 said retaining teeth are configured to prevent the optical cable to slide relative to the retaining element along the longitudinal direction.

* * * * *